J. G. MacPHERSON.
TAXIMETER.
APPLICATION FILED JAN. 27, 1910.

1,000,275.

Patented Aug. 8, 1911
6 SHEETS—SHEET 1.

WITNESSES
G. M. Spring
Ralph Healy

INVENTOR
John G. MacPherson
by David B. Moore
His Attorney

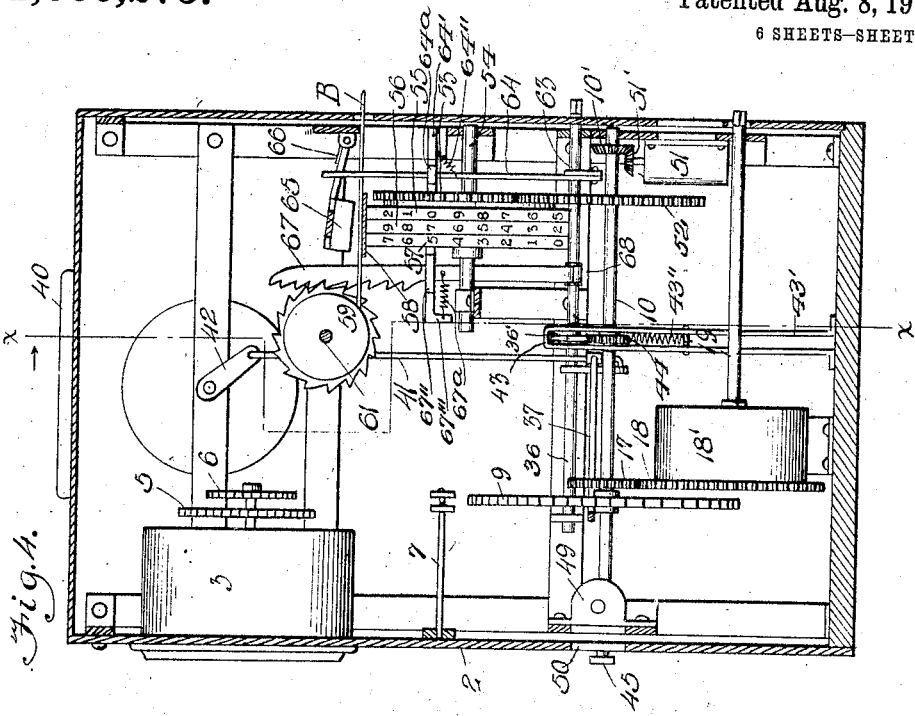
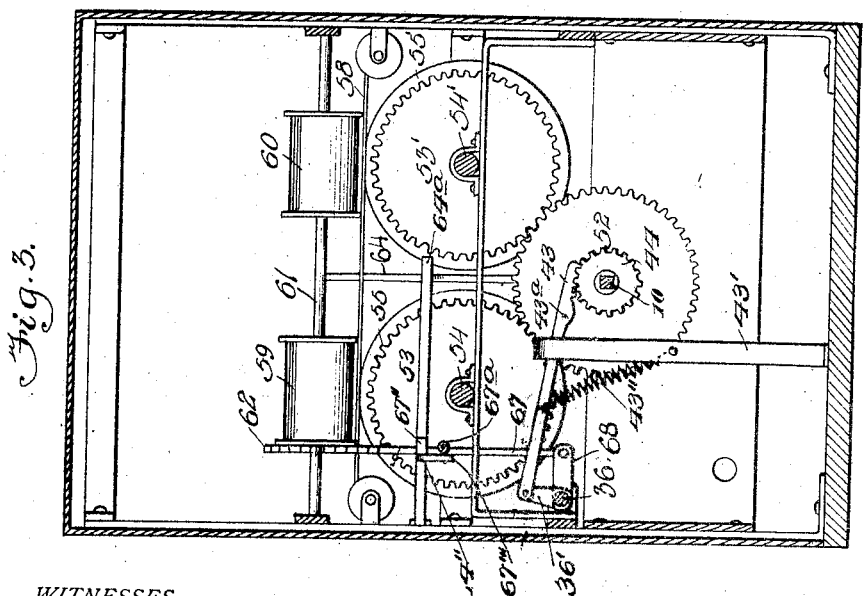

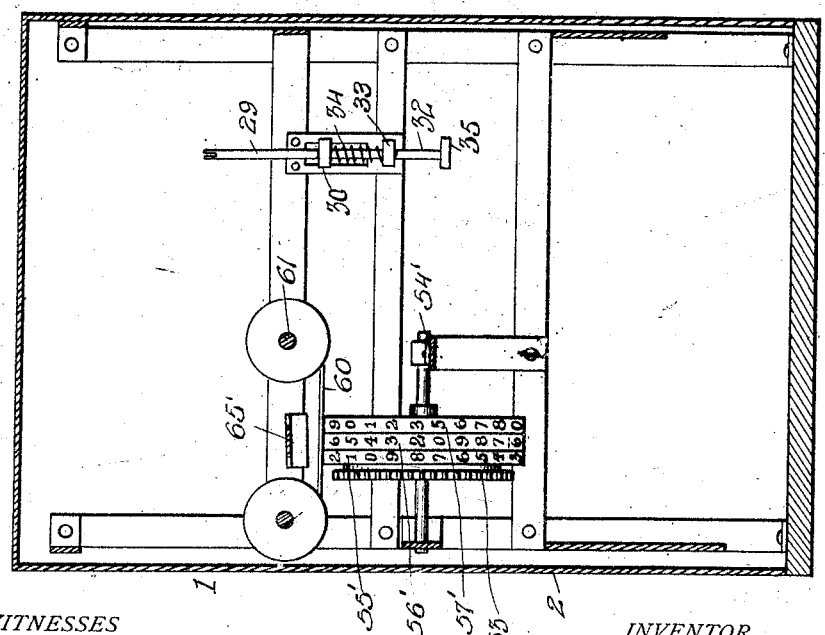

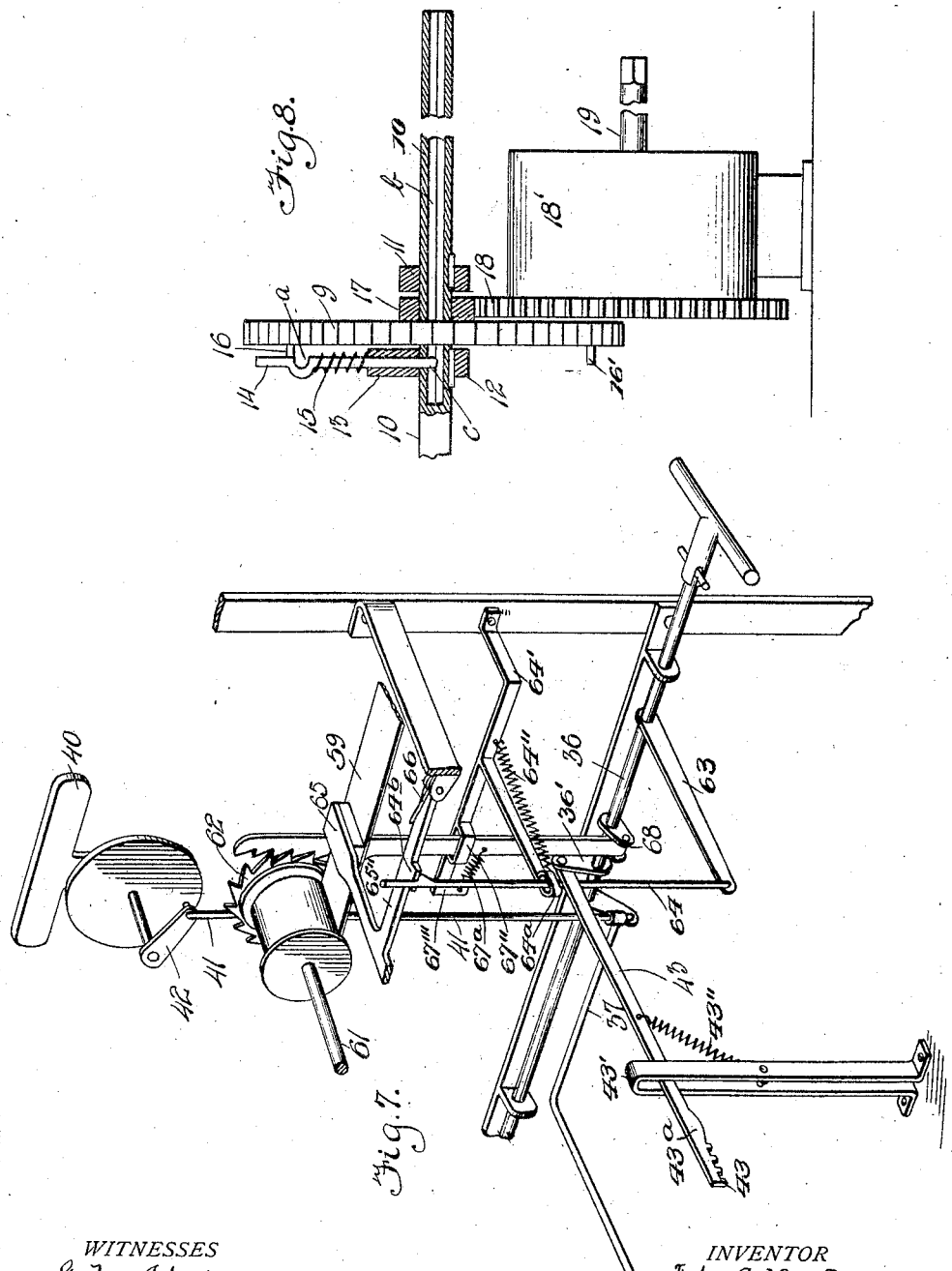

J. G. MacPHERSON.
TAXIMETER.
APPLICATION FILED JAN. 27, 1910.
1,000,275.
Patented Aug. 8, 1911.
6 SHEETS—SHEET 5.
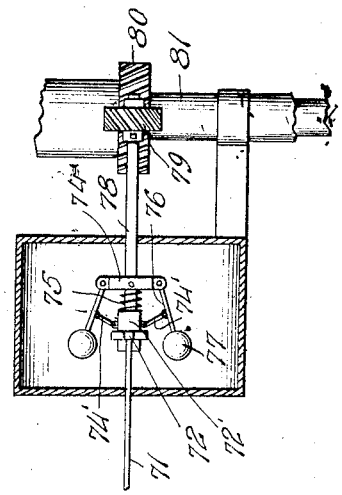
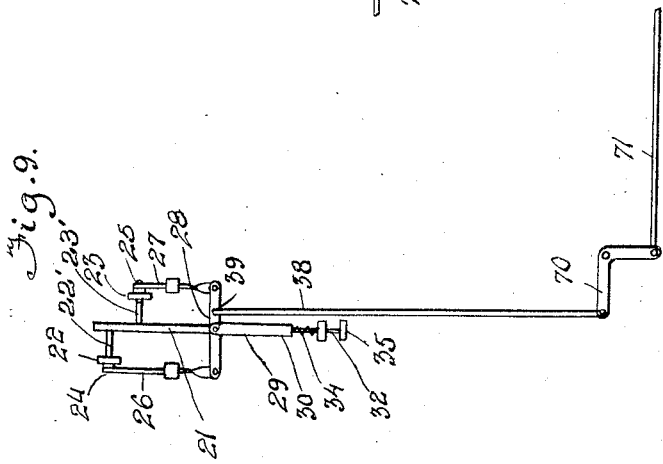
WITNESSES
J. M. Spring.
Ralph Healy
INVENTOR
John G. MacPherson
by David D. Moore
his Attorney.

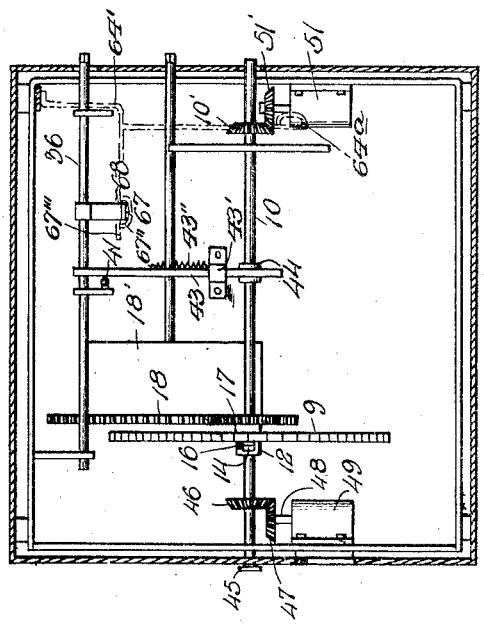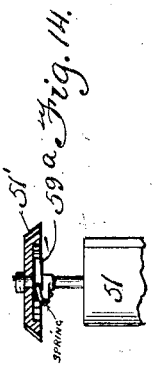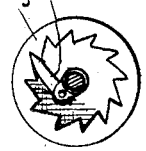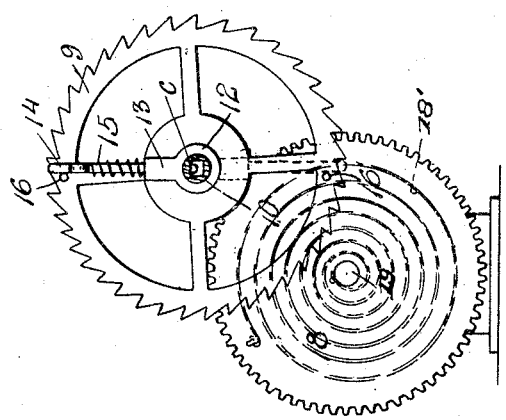

UNITED STATES PATENT OFFICE.

JOHN G. MacPHERSON, OF PHILADELPHIA, PENNSYLVANIA, ASSIGNOR, BY DIRECT AND MESNE ASSIGNMENTS, TO THE MacPHERSON COMPANY, INCORPORATED, A CORPORATION OF DELAWARE.

TAXIMETER.

BEST AVAILABLE COPY 1,000,275.      Specification of Letters Patent.      Patented Aug. 8, 1911.

Application filed January 27, 1910. Serial No. 540,446.

*To all whom it may concern:*

Be it known that I, JOHN G. MACPHERSON, a citizen of the United States, residing at Philadelphia, in the county of Philadelphia and State of Pennsylvania, have invented certain new and useful Improvements in Taximeters, of which the following is a specification, reference being had therein to the accompanying drawing.

This invention relates to improvements in taximeters.

In this instance, I employ a clock, as the medium whereby the taximeter mechanically registers for "running" and "waiting" rates the fare, prints a receipt coupon of the fare paid by the passenger, retains a permanent printed record of the numbers of trips and the amount of each trip, and gives a record of the full amount the machine has earned.

To clearly illustrate the invention, attention is invited to the accompanying drawings, in which:—

Figure 2:
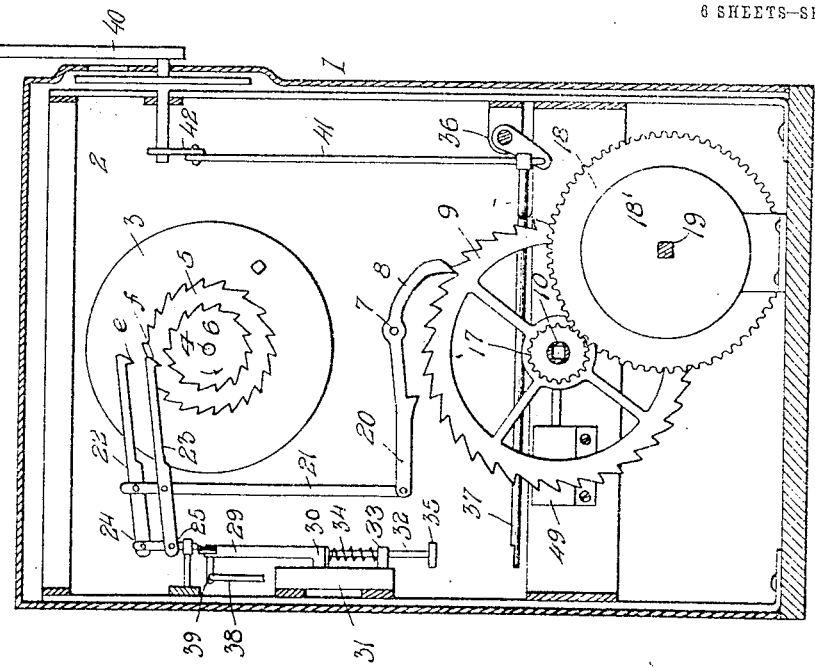
Figure 1:
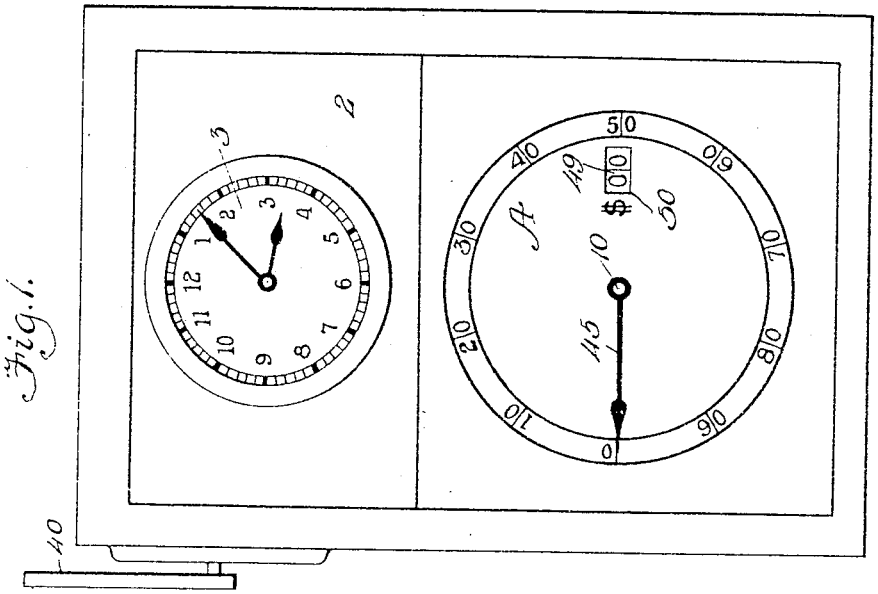

Figure 1 is a front elevation of the machine. Fig. 2 is a skeleton view in rear elevation of the clock, and the escapement mechanism, whereby the indicating mechanisms are controlled at two different rates. Fig. 3 is a vertical section through the machine tal on line $x$—$x$, Fig. 4, looking in the direction of the arrow. Fig. 4 is a section taken on line $y$—$y$, Fig. 6, looking in the direction of the arrow. Fig. 5 is a section taken on line $z$—$z$, Fig. 6, looking in the direction of the arrow, the clock not being shown. Fig. 6 a top plan view of the machine. Fig. 7 is a perspective view of the key-shaft and its various connections. Fig. 8 is a section through the main shaft, showing the escapement wheel, and initial fare mechanism, and also the mechanism for returning the visual indicators to 0, without affecting the escapement. Fig. 9 is a detail view of the two rate control. Fig. 10 is a detail view of the remainder of the control carried by the taxicab. Fig. 11 is a front elevation of the mechanism shown in Fig. 8. Fig. 12 is a section taken on line $a$—$a$, Fig. 4, looking downwardly. Fig. 13 is a detail view of the pawl and ratchet employed on total counter, and also on pinion 44. Fig. 14 shows a portion of the total counter with its gear in section to show the ratchet clearly. Fig. 15 is a plan view of the key used for returning the indicating mechanism and registers, except the total counter to zero.

Referring to the drawings:—the numeral 1 designates the frame or casing, in whose front wall 2, is mounted the clock 3, upon whose minute hand arbor 4, is keyed and rotatable therewith, the large "running" time rate toothed wheel 5, and the smaller "waiting" time rate toothed wheel 6, the teeth of the latter being of the same length and depth as the teeth of the wheel 5, but of a lesser number, thereby dividing the hour period into a lesser number of periods than the wheel 5. Swingingly or pivotally mounted upon a pin 7, (Figs. 2 and 4) below the clock, is the escapement pawl or dog 8, which controls the movement of the toothed escapement wheel 9, and its operating integral or fast pinion 17. The wheel 9 and pinion 17, are loosely mounted upon the main-shaft 10, between the rear collar 11 Fig. 8 and the front collar 12, which is provided with the channeled stud or sleeve 13 Figs. 8 and 13, for the reception of the sliding pin 14, which is normally held toward the shaft by means of the coiled spring 15. Upon the front face of the wheel 9, are the two diametrically-opposite pins or studs 16 and 16', the sliding pin 14 being normally in the path of said studs 16 and 16', and being provided with a notch or recess $a$. When the key O, as shown in Fig. 15, and having the beveled end O', is pushed into the squared socket $b$, of the main shaft 10, said key presses upon the inner end $c$, of the sliding pin 14, and pushes said pin 14 outwardly and places the recess $a$ in the path of the pins 16 and 16', so that the main-shaft may be rotated without affecting the escapement wheel, the purpose of which will presently appear. The small pinion 17, at all times meshes with the large gear 18, secured to a spring in the casing 18', having the spring key-shaft 19.

Pivoted to the outer end of the lever 20, of escapement pawl 8, is a vertically movable link 21, guided in the guide 21ª and pivoted to an upper pivoted "running" time rate pawl 22 and the lower pivoted "waiting" time rate pawl 23, which normally have their toothed ends $e$ and $f$, in engagement with the teeth of the wheels 5 and 6, respectively. But in order to prevent this, and permit only one at a time to be in engagement with its respective wheel, I pivot the lever ends 24 and 25, respectively of the pawls, to the long link 26 Fig. 9 and the short link 27, respectively, by pawls 22′ and 23′ which are connected by said links 2 to the rock-shaft 28, which is pivoted intermediate of its ends to the upper end of the supporting fulcrum 29, whose lower end forms a bracket 30, slidingly mounted in the guide-support 31 Fig. 2. Extending downwardly from the underside of bracket 30 is a pin 32, which is slidably mounted in the stud 33, and is provided with a spring 34, which normally exerts a tension to pull the bracket 30 toward the stud 33, thereby lowering the ends of the pawls 22 and 23, and automatically holding their toothed ends from engagement with the wheels, thus by this means the arbor of the clock is relieved of the friction of the pawls 22 and 23, when the machine is inoperative. Upon the lower end of the stud 32 is a button 35, whereby as the starting key-shaft 36, is moved by the chauffeur when the taxicab is engaged, the rod 37 rigid with 41, Fig. 2, is raised, and engages the button 35, lifting the same and the bracket 30 with its parts, so that the pawls 22 or 23 may engage their toothed wheels. The rod 38 of the automatic control (Figs. 9 and 10), whose upper rod is connected to the crank 39 of the rock-shaft 28 raises the proper end 24˙ or 25 of the pawls 22 and 23, so that only the proper pawl engages either the wheel 5 or 6, if for instance the taxicab is at a standstill, the pawl 23 is thrown in while the pawl 22 is thrown up and out, or when the taxicab is moving the reverse occurs. As the starting key-shaft 36 is moved as above, the for hire signal 40, is tilted downwardly to indicate that the taxicab is engaged, the link 41 and its crank 42, causing this action. Simultaneously with the movement of the key-shaft 36, the toothed rack 43, (Figs. 4, 7,) connected to said key-shaft and guided in the guide 43′, and having a spring 43″, which normally holds the rack 43 toward the pinion 44, is moved so as to actuate the pinion 44, (Fig. 4) mounted upon the main-shaft 10, through the medium of a pawl and ratchet mechanism, (similar to that shown in Figs. 13 and 14) which permits the rack to rotate the shaft one-half revolution or until the pin 16 Figs. 8 and 11 strikes the pin 14, at which time, the pointer 45 Fig. 1 carried upon the outer end of the shaft 10, will have been moved from 0 to 50, indicating the initial fare of 50 cents in this instance. As shown in Figs. 4 and 7, the guide 43′ permits a vertical movement of the rack 43, so that when its rounded portion 43ᵃ, rides upon the pinion 44, the teeth of the rack is thrown out of engagement or mesh with the said pinion, but as the guide is of sufficient height the spring 43″, lightly holds the rack 43 toward said pinion 44, and thus insures the proper positioning of said rack with relation to the pinion, the guide 43′ and spring 43″, at all times holding the rack in operative position. As the minute hand arbor of the clock rotates, the escapement pawl in the direction indicated by the arrow, Fig. 2 is operated through the medium of either pawl 22 or 23, permitting the gear 18 operated by its spring to turn the escapement wheel 9, which moves the one-half revolution without affecting the shaft 10, or until the pin 16′ Figs. 8 and 11, engages the pin 14, at which time, the operation of the escapement wheel 9, will press against the pin 14, and thus rotate the main shaft 10, with it, move the pointer 45′ Fig. 1 to indicate further amounts upon the dial A. The inclined shoulder 43ᵃ upon the rack 43 throws the rack from engagement with the pinion 44, so that the said rack will not interfere with the rotation of the shaft 10, but will permit the rack to be drawn back upon the pinion 44, when the key-shaft is returned to normal position, the pinion 44, during this action rotating free from the shaft 10. When the main shaft 10, has made one complete revolution, or so that the pointer 45 is again at 0, the bevel gear 46 Fig. 12, will have turned the similar sized bevel gear 47 mounted upon the shaft 48, of the decimal counter 49, which is constructed similarly to the Veeder counters, and is secured to the front wall so that its digits will be observable through the peephole or aperture 50, thus showing the amount of dollars, the said decimal counter in this instance being provided with two counting disks or wheels, whereby $99 may be registered without repeating. In order to retain a permanent counter or total adder for the amount received by the machine, I employ the Veeder counter 51, or one similar thereto, and this is connected to the main shaft 10, through the medium of the shaft gear 10″, and the counter ratchet and pawl gear 51′, (Figs. 13 and 14) which permits the shaft 10 to operate the counter in only one direction or while the counter 45 moves away from 0. The gear 51′, is provided, as shown in Figs. 13 and 14, with the pawl and ratchet 59ᵃ.

Keyed to and rotatable with the main shaft 10, is a pinion 52 Figs. 3 and 4, which meshes at all times with the two similar sized pinions 53 and 53′, loosely mounted upon the shafts 54 and 54′, respectively, and carrying the cents recording or type wheels 55 and 55′, respectively, of the coupon receipt printing mechanism and permanent printing record mechanism. When the wheels 55 and 55′ have been rotated nine steps they actuate the unit dollar wheels 56 and 56′, respectively by well known carrying mechanism, and when the latter have been rotated nine steps, the tens dollar wheels 57 and 57', are actuated. Thus it will be seen that the movement of the shaft 10 will simultaneously actuate the pointer 45, the dollar counters 49 and 51, and type wheels of the two recording and printing mechanisms. The type-writer ribbon 58 Fig. 3 passes above the type wheels of both mechanisms, and below the coupon tape 59 and the record tape 60, whose respective feed spools are keyed to and rotatable with the shaft 61, carrying the ratchet wheel 62 near the coupon tape spool. To stop the main shaft 10 from actuating the various registering and recording mechanisms, the key-shaft 36, is turned so as to cause the rod 37 Fig. 2 to release the button 35, so that the spring 34 will actuate the pawls 22 and 23 and throw them from engagement with their wheels 5 and 6. By a continued movement of the key-shaft 36, the arm or crank 63 Fig. 7 pushes the vertically movable link 64, which is guided in the slotted arm 64ª, Figs. 3, 4, 6, 7 and 12, carried by the support 64', the spring 64'', normally holding the link 64 so that its upper or trigger end will engage the abutment 64ᵇ, of the spring returned printing platens' support 65'', carrying the printing platens 65 and 65', respectively, upwardly. This action lifts the two platens 65 and 65', until the trigger 64 releases the abutment of the support 65'', at which time said platens snappily engage the ribbon 58 and press it down upon the coupon and record tapes and type wheels simultaneously, thus printing the amount shown by the visual indicator upon the coupon tape and record tape, the spring 66, releasing the platens just after pressure, so that the rack 67, vertically movable in the loop 67'', of the support 64' and held toward the ratchet 62 by the spring 67ª and having its lower end connected to the arm 68, 67 will engage the ratchet 62, and rotate the shaft 61, winding the record tape upon its feed spool, and project the printed coupon B, through the slot 68, in the rear of the casing. This is then torn off by the chauffeur, who gives it to the passenger, who pays the amount marked thereon if it tallies, and it should, with the visual indicators 45 and 49. To return the visual indicator, and type wheels to 0, and not affect the counter 51, the chauffeur inserts the key 0, Fig. 15 in the socket b, of the shaft 10, far enough to engage the end c Fig. 8, of the sliding pin 14, this action as before mentioned places the notch a, in the path of the pins 16 and 16', so that the chauffeur can now rotate manually the shaft 10 in the opposite direction without affecting the escapement wheel 9, and thus return the pointer 45 to 0, and the counter 49 to 0, and co-incidently both sets of type wheels to 0, thus placing the machine ready for the next passenger, the counter 51, retaining the added amount of the cash received for the ride.

In Figs. 9 and 10, I have illustrated my automatic device for changing the actuating of the indicating mechanism from "running" rate to "waiting" rate, this action being entirely under the control of the rear hub or movable axle 81 of the vehicle. In this instance, the rod 38, has its lower end pivoted to the forward member of the bell-crank lever 70, which is secured to the vehicle so that its lower member has operatively pivoted thereto the long connecting rod 71, whose rear end, is connected to the collar 72, which is adapted to be held in the position as shown in Fig. 10, by means of the spring 75. This spring 75, exerting a tension against the sliding and rotatable sleeve 72', forming a part of a governor mechanism, pushes the sleeve 72', toward the forward end of the shaft 78, while as the shaft 78 is rotated through the medium of the axle 81, gear 80, and worm gear 79, the arms 76 with their balls 77, are thrown outwardly by centrifugal force and pull the sleeve 72', compressing the spring 75, and also pulling upon the rod 71. This action of the rod 71, operates the bell-crank lever 70, and pulls the rod 38 downwardly, lowering the end of the rocking shaft 28, to which the rod 38 is connected, so that the other end is raised to cause the pivoted end of the "running" time rate pawl 22, to be raised and its pawl e to engage the ratchet 5, while simultaneously with this action the rear end of the "waiting" time rate pawl 23 is lowered, lifting the pawl end f, thereof from engagement with the ratchet 6, Figs. 2 and 9. When the vehicle stops, the shaft 78 stops, and the spring 75 pushes upon the sleeve 72' thereby pushing the rod 71, and raising the rod 38 and the proper end of the rocking shaft 28, this action disengaging the pawl e of the "running" time rate ratchet 22, from its ratchet 5, and causing the pawl f, of the "waiting" time rate ratchet 23, to engage its ratchet 6. By this means the two pawls 22 and 23, are under the direct control of the movement of the vehicle, thus relieving the chauffeur of the necessity of operating the shift from "running" rate to "waiting" rate and vice versa.

What I claim, as new is:—

1. In a taximeter, the combination with a clock, and indicating mechanism, of mechanism controlled through the medium of the clock for operating the indicating mechanism at two different rates, comprising an escapement mechanism, and means for operably connecting the same with the minute hand arbor of the clock.

2. In a taximeter, the combination with a clock, mechanism for registering the fare, mechanism for printing a receipt of the fare paid by passenger, mechanism for making a permanent record of cash received, and mechanism for keeping a total of cash received, of mechanism mechanically operated from the minute hand arbor of the clock for permitting said mechanisms to operate at two different rates.

3. In a taximeter, the combination with a clock, and indicating mechanism, of mechanism mechanically operated from the minute hand arbor of the clock for permitting said indicating mechanism to operate at two different rates, mechanism for operating the indicating mechanism to indicate an initial fare, and means whereby the said indicating mechanism is returned to normal position.

4. In a taximeter, the combination with a clock, mechanism for registering the fare, mechanism for printing a receipt of the fare paid by passenger, and mechanism for making a permanent record of cash received, of mechanism mechanically operated from the minute hand arbor of the clock for permitting said mechanisms to operate at two different rates.

5. In a taximeter, the combination with a clock, mechanism for registering the fare, mechanism for printing a receipt of the fare paid by passenger, and mechanism for making a permanent record of cash received, of mechanism controlled through the medium of the clock for operating said mechanisms at two different rates, comprising an escapement mechanism, and means for operably connecting the same with the minute hand arbor of the clock.

6. In a taximeter, the combination with a clock, mechanism for registering the fare, mechanism for printing a receipt of the fare paid by passenger, mechanism for making a permanent record of cash received, and mechanism for retaining a total of fares received, of mechanism controlled through the medium of the clock for operating said mechanisms at two different rates, comprising an escapement mechanism, and means for operably connecting the same with the minute hand arbor of the clock.

7. In a taximeter, the combination with a clock, and indicating mechanism, of mechanism operable from the minute hand arbor of the clock for controlling said mechanism at two different rates, comprising two separate means operably connected to and rotatable with the minute hand arbor, an escapement mechanism operably connected with said indicating mechanism, two separate means carried by the escapement mechanism and adapted to co-act with the means of the arbor of the clock, and means for causing one means of the arbor and one of the escapement to be in operation at the same time.

8. In a taximeter, the combination with a clock, mechanism for registering the fare, mechanism for printing a receipt of the fare paid by passenger, and mechanism for making a permanent record of cash received, of mechanism operable from the clock for controlling said mechanisms at two different rates, comprising two separate means carried by and rotatable with the minute hand arbor of the clock, an escapement mechanism operably connected with said clock controlled mechanisms and through which they are operated, two separate means carried by the escapement mechanism and adapted to co-act with the means of the arbor of the clock, and means for causing one means each of the arbor and escapement to co-act and thus control the mechanisms through the clock and escapement mechanism.

9. In a taximeter, the combination with a clock, mechanism for registering the fare, mechanism for printing a receipt of the fare paid by passenger, mechanism for making a permanent record of cash received, and mechanism for retaining a total of fares received, of mechanism operable from the clock for controlling said mechanisms at two different rates, comprising two separate means carried by and rotatable with the minute hand arbor of the clock, an escapement mechanism operably connected with said mechanisms and through which they are operated, two separate means carried by the escapement mechanism and adapted to co-act with the means of the arbor of the clock, and means for causing one means each of the arbor and escapement to co-act and thus control the mechanisms through the clock and escapement mechanism.

10. In a taximeter, the combination with a clock, and indicating mechanisms, of means for controlling the mechanism through the medium of the clock, comprising two different diametered toothed wheels carried by and rotatable with the minute hand arbor of the clock, and escapement mechanism operably connected with the indicating mechanism, means carried by the escapement mechanism and adapted to be placed in operable relation to the toothed wheels of the arbor for causing the clock to operate the escapement mechanism, and means for causing either one of the toothed wheels to operate the escapement mechanism.

11. In a taximeter, the combination with a clock, mechanism for registering the fare, mechanism for printing a receipt of the fare paid by passenger, and mechanism for making a permanent record of cash received, of means for controlling the mechanisms through the medium of the clock, comprising two different diametered toothed wheels carried by and rotatable with the minute hand arbor of the clock, an escapement mechanism operably connected with said mechanisms, means carried by the escapement mechanism and adapted to be placed in operable relation to the toothed wheels of the arbor for causing the clock to operate the escapement mechanism, and means for causing either one of the toothed wheels to operate the escapement mechanism.

12. In a taximeter, the combination with a clock, mechanism for registering the fare, mechanism for printing a receipt of the fare paid by passenger, mechanism for making a permanent record of cash received, and mechanism for retaining a total of fares received, of means for controlling said mechanisms through the medium of the clock, comprising two different diametered toothed wheels carried by and rotatable with the minute hand arbor of the clock, an escapement mechanism operably connected with said mechanisms, means carried by the escapement mechanism and adapted to be placed in operable relation to the toothed wheels of the arbor for causing the clock to operate the escapement mechanism, and means for causing either one of the toothed wheels to operate the escapement mechanism.

13. In a taximeter, the combination of a clock, mechanism for registering the fare, mechanism for printing a receipt of the fare paid by passenger, mechanism for making a permanent record of the cash received, mechanism for registering the total of the fares received, a main shaft operably connected to all of said mechanisms, an escapement mechanism operably connected to said main shaft, and co-acting means carried by the minute hand arbor of the clock and the escapement for operating the mechanisms through the medium of the clock and the escapement mechanism.

14. In a taximeter, the combination of a clock, indicating mechanism, a main shaft operably connected to said mechanism, an escapement mechanism operably connected to said main shaft, two co-acting means carried by the minute hand arbor of the clock and the escapement, and means for permitting one and only one of said co-acting means to be operable at a time.

15. In a taximeter, the combination of a clock, mechanism for registering the fare, mechanism for printing a receipt of the fare paid by passenger, mechanism for making a permanent record of cash received, mechanism for registering the total of the fares received, a main shaft operably connected to said mechanisms, an escapement mechanism operably connected to said main shaft, two co-acting means carried by the minute hand arbor of the clock and the escapement, and means for permitting one and only one of said co-acting means to be operable at a time.

16. In a taximeter, the combination of a clock, indicating mechanism, a main shaft operably connected to the indicating mechanism, an escapement mechanism for operating said main shaft, two toothed wheels of different diameters carried by the minute hand arbor of the clock and rotatable therewith, two pawls operably connected to the escapement mechanism, and means whereby either one of the pawls and its toothed wheel are engaged at a time, as and for the purpose set forth.

17. In a taximeter, the combination of a clock, mechanism for registering the fare, mechanism for printing a receipt of the fare paid by passenger, mechanism for making a permanent record of the cash received, mechanism for registering the total of the fares received, a main shaft operably connected to said mechanisms, an escapement mechanism for operating said main shaft, two toothed wheels of different diameters carried by and rotatable with the minute hand arbor of the clock, two pawls operably connected to the escapement mechanism, and means whereby either one of the pawls and its toothed wheel are engaged at a time, as and for the purpose set forth.

18. In a taximeter, the combination with a clock, indicating mechanism; and mechanism controlled through the medium of the clock for operating the indicating mechanism at two different rates, comprising an escapement mechanism, means for operably connecting the same with the minute hand arbor of the clock, and means for selecting the rate at which the indicating mechanism is operated; of means controllable by the movements of the vehicle for operating said selecting means.

19. In a taximeter, the combination with a clock, of registering mechanism, a spring motor for controlling said registering mechanism, and means coöperating with said clock for varying the rate of said motor.

20. In a taximeter, the combination with a clock, of registering mechanism, a variable rate spring motor actuating said registering mechanism, and means coöperating with said clock for varying the rate of said motor.

21. In a taximeter, the combination with a clock, of a plurality of ratchet wheels actuated by said clock, a registering mechanism, a variable rate motor controlling said registering means, and means coöperating with said ratchet wheels for controlling said motor.

In testimony whereof I affix my signature in presence of two witnesses.

JOHN G. MacPHERSON.

Witnesses:
DAVID P. MOORE,
E. H. PARKINS.